US007346497B2

(12) United States Patent
Pi et al.

(10) Patent No.: US 7,346,497 B2

(45) Date of Patent: Mar. 18, 2008

(54) HIGH-ORDER ENTROPY ERROR FUNCTIONS FOR NEURAL CLASSIFIERS

(75) Inventors: Xiaobo Pi, Beijing (CN); Ying Jia, Beijing (CN)

(73) Assignee: Intel Corporation, Santa Clara, CA (US)

( * ) Notice: Subject to any disclaimer, the term of this patent is extended or adjusted under 35 U.S.C. 154(b) by 873 days.

(21) Appl. No.: 10/332,651

(22) PCT Filed: May 8, 2001

(86) PCT No.: PCT/CN01/00686

§ 371 (c)(1), (2), (4) Date: Jun. 10, 2003

(87) PCT Pub. No.: WO02/091355

PCT Pub. Date: Nov. 14, 2002

(65) Prior Publication Data

US 2005/0015251 A1 Jan. 20, 2005

(51) Int. Cl.
*G10L 11/00* (2006.01)

(52) U.S. Cl. ...................... 704/202; 704/219; 704/232

(58) Field of Classification Search ................ 704/202, 704/236, 219, 232, 253, 256.8; 382/156-159, 382/185, 228; 706/12, 16, 20, 25

See application file for complete search history.

(56) References Cited

U.S. PATENT DOCUMENTS

| | | | | |
|---|---|---|---|---|
| 5,276,771 | A * | 1/1994 | Manukian et al. | 706/25 |
| 5,509,103 | A * | 4/1996 | Wang | 704/232 |
| 5,943,661 | A * | 8/1999 | Katz | 706/16 |
| 6,018,728 | A * | 1/2000 | Spence et al. | 706/20 |
| 6,456,991 | B1 * | 9/2002 | Srinivasa et al. | 706/20 |

OTHER PUBLICATIONS

Sethi, "Entropy Nets: from decision trees to Neural Networks", Proceedings of the IEEEvol. 78, No. 10, Oct. 1990, pp. 1605-1613.*

Rose, "Deterministic Annealing for CLustering, Compression, Classification, Regression, and Related Optimization Problems", Proceedings of the IEEE, vol. 86, No. 11, Nov. 1998, pp. 2210-2239.*

* cited by examiner

*Primary Examiner*—Michael N Opsasnick
(74) *Attorney, Agent, or Firm*—Blakely, Sokoloff, Taylor & Zafman LLP

(57) ABSTRACT

An automatic speech recognition system comprising a speech decoder to resolve phone and word level information, a vector generator to generate information vectors on which a confidence measure is based by a neural network classifier (ANN). An error signal is designed which is not subject to false saturation or over specialization. The error signal is integrated into an error function which is back propagated through the ANN.

12 Claims, 4 Drawing Sheets

60 PROVIDE TRAINING PATTERNS IN SEQUENCE

62 SELECT NEXT TRAINING PATTERN

64 PRODUCE ERROR SIGNAL

68 EVALUATE ERROR SIGNAL ERROR > ACTUAL Δ

YES

NO

70 UPDATE WEIGHTS

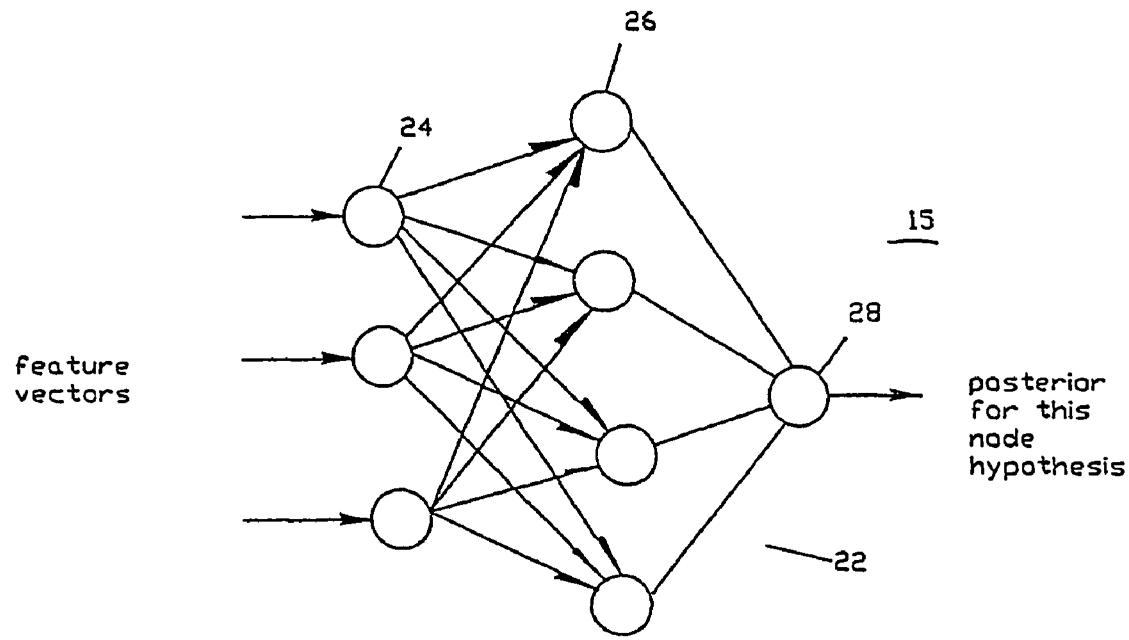
FIG.2: a 3-layer multi-layer perceptron (MLP)
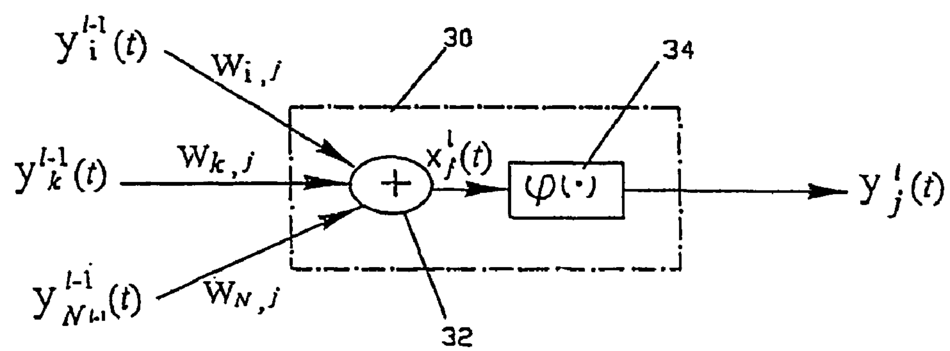
FIG.3: computation operation in node j at the l-th layer

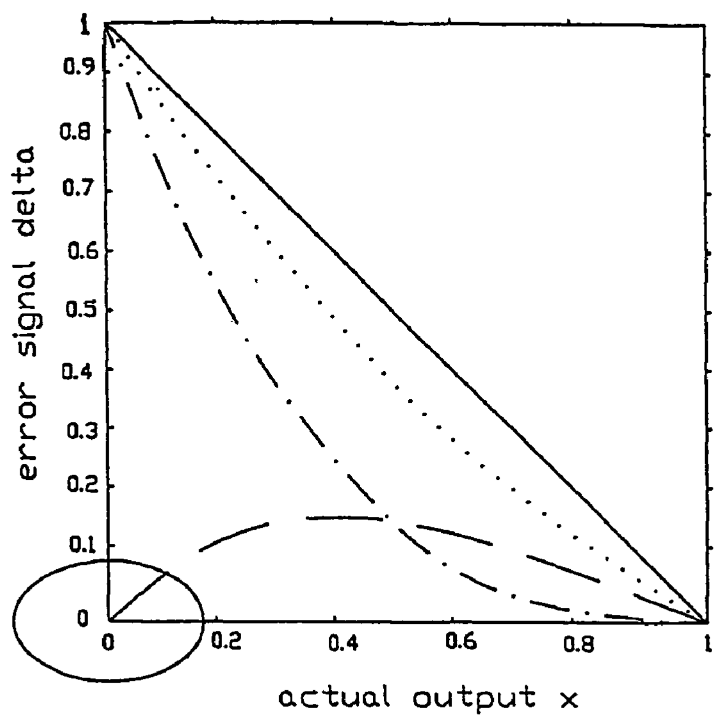
FIG.4: error signals and the actual outputs at the target output being 1.0
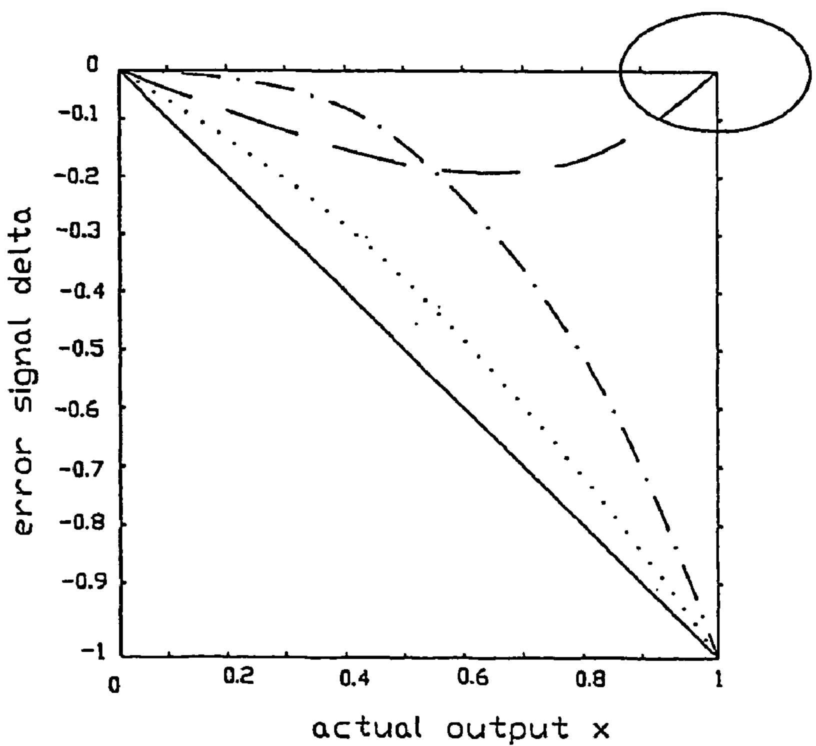
FIG.5: error signals and the actual outputs at the target output being 0.0

HIGH-ORDER ENTROPY ERROR FUNCTIONS FOR NEURAL CLASSIFIERS

FIELD OF INVENTION

The present invention relates to automatic speech recognition, and more particularly to a neural network classifier.

BACKGROUND OF THE INVENTION

In automatic speech recognition, a user creates sound detected by an audio circuit. Audio information is provided by the audio circuit to a speech decoder. The speech decoder produces outputs indicative of words that are resolved from inputs from the audio circuit. Many forms of known models for phones and words are used to produce a best correlation between a spoken word and a word in the vocabulary of the speech decoder. A phoneme is a basic unit of sound in a language. Most languages can be resolved into approximately 45 phonemes. A phone is a unit based on a phoneme That is resolved by the decoder.

After the decoder resolves phone and word level information, further operations are utilized to generate further information, particularly information vectors, on which a confidence measure the word resolved will be based. Different known schemes utilize language models, parsers or other measures utilizing decoder outputs as input information. A confidence measure is produced by a classifier. The output of the classifier is generally compared to a threshold level. If the confidence level is at least equal to the threshold level, then an accept signal is produced. If the confidence level is lower than the threshold, a reject signal is provided Misread words or out of vocabulary words(OOVs) are not reported by the speech recognizer.

The classifiers may use different methods of analysis to produce an output Most commonly utilized classifiers comprise Linear Discriminant Analysis (LDA) classifiers and Artificial Neural Network (ANN) classifiers. It is desirable to provide improved automatic speech recognition systems in which an improved neural network classifier interacts within the system. Neural networks require the use of training algorithms so that they can determine when a speech result appears to be reliable. Particularly for larger neural networks, fast convergence is required. In other words, within a limited number of layers, the information vectors generated based on outputs of the decoder must be made to converge to a single dimension. Additionally, generalization, the ability To perform when operating on new test data must also be provided.

Various prior art training algorithms have been used for generation of confidence measurements. The most well-known is the Error Back-forward Propagation (EBP) algorithm. This algorithm is inefficient in that it has slow convergence and long training time compared to other competing techniques. One draw back is the false saturation of output nodes. The algorithm is also know as the Mean Square Error (MSE). As an alternative, the Cross Entropy (CE) error function has been used to resolve the false saturation, leading to fast convergence. However, this algorithm also leads to over specialized learning. Therefore, the trained network does not provide for generalization.

BRIEF DESCRIPTION OF THE DRAWINGS

The invention is disclosed by way of example and not by way of limitation.

FIG. 2 is a block diagram of a Multi-Layer Perceptron (MLP) classifier.

FIG. 3 is a more generalized block diagram of a node of a Multi-Layer Perceptron (MLP) neural network pattern classifier.

FIG. 4 and FIG. 5 are each a graph of error signal delta versus actual output x for target outputs being 1.0 and 9.9 respectively.

DETAIL DESCRIPTION OF THE INVENTION

Figure 1:
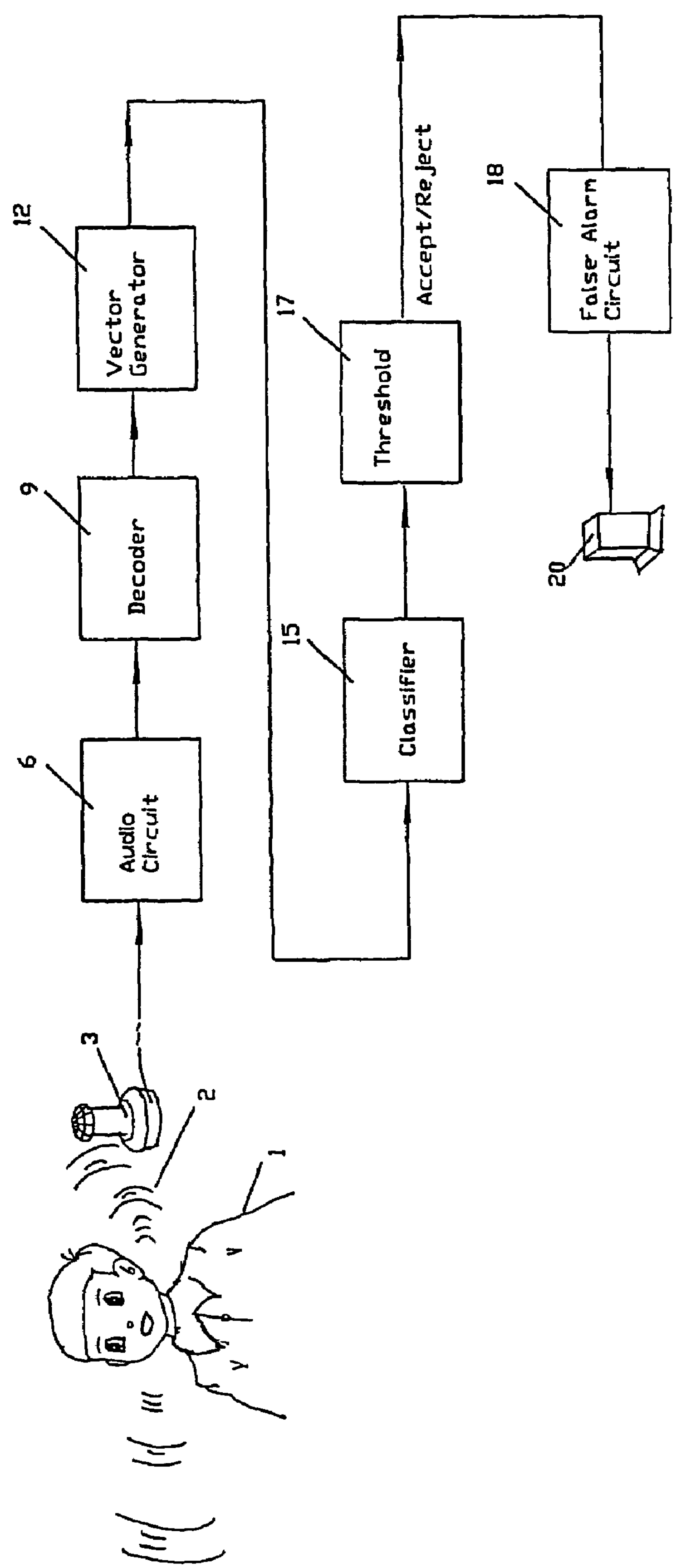
FIG. 1 is a block diagram illustrating a automatic speech recognition system.

FIG. 1 is a block diagram of an automatic speech recognition system embodying the present invention. In the system of FIG. 1, a user 1 speaks and produces sounds 2 which are converted to electrical signals by a microphone 3. In the example of FIG. 1, a user 1 wishes to make a hands-free call and speaks into a microphone 3. The microphone maybe included in a hands-free telephone or other device. The microphone 3 converts the voice of the user 1 into electrical circuits processed by an audio circuit 6.

Speech signals from the audio circuit 6 are indicative of the sounds voiced by the user 1, and decoded by a decoder 9. Many well-known forms of a decoder 9 are used in the art. As described above, a decoder 9 utilizes a model after a training operation has been performed. The audio circuit 6 and decoder 9 maybe provided, for hands-free telephone applications in the environment of voice processing circuit boards. One example of a voice processing circuit board is the model D/41EPCI4-PCI voice processor made by Dialogic Corporation. This board is a four port analog voice processing board incorporating an architecture known under the trademark Signal Computing System Architecture™ (SCSA™). Particular inputs provided and outputs generated in accordance with the present invention are further discussed below. A particular circuit board cited above allows interaction of the basic circuit software and hardware with additional boards. Consequently, a prior art circuit maybe straightforwardly modified in accordance with the present invention.

The present system is directed toward recognizing names. Full sentences will not be resolved from the audio input. Consequently, no language model will be used during decoding. Similarly, no parser is used after decoding. Therefore, language models and parser information will not be used to provide information in confidence scoring. What is being provided from the decoder 9 is output indicative of acoustic level information, namely phone and word level features.

Since only acoustic level information is being obtained phone and word level features beyond the basic phone feature are derived and produced. The basic phone feature is $p(x|u)$, which is the probability that information based on a number of speech frames x corresponds to a particular model u of a given phone. In a preferred form, the decoder also generates the basic level word score $b(x|w)$ which is the likelihood that a certain group of frames x represents a word w. Individual phonemes do not work well is practice as units on which to base recognition because there is too much variation due to articulatory effect from adjacent sounds. A “standard” feature set used for many speech recognizers is a 39 dimensional feature vector consisting of 12 mel frequency cepstral coefficients normalized log energy, $\Delta$ and $\Delta$-$\Delta$ coefficients. The cepstrum separates vocal tract parameters from their exitation signal. Lower order coefficients in the cepstrum represent slowly varying vocal tract parameters and remaining coefficients model the quickly varying exitation signal and pitch. Speech recognition is generally only interested in the first 13 ceptsral coefficients. Lower order coefficients are often omitted in favor of the energy measures of the higher orders. In the present embodiment, the coefficients used include those of the twelfth order. Mel-frequency cepstral coefficients approximate the critical band of the human auditory system by warping the frequency access prior to linear transform.

The front end output of a speech recognizer represents only a portion of the computational power needed to obtain results with a known confidence level. Therefore, in accordance, further measurements based on the output of the decoder 9 are generated which may be efficiently utilized for measuring confidence level. These features may be processed in a computationally efficient manner. These features are generated by a vector generator 12 which receives input from the decoder 9. These inputs are described in greater detail with respect to FIG. 2.

The vector generators are provided to a classifier 15 which is a confidence measure feature vector classifier. The classifier 15 may be an artificial neural network (ANN). Alternatively, the classifier 15 could comprise Linear Discriminant Analysis (LDA) linear classifier.

Of course, the classifier 15 must be trained. A common way to resolve shortcomings in the prior art is to design a new set of error functions. Then, error signals can be derived, and then a back-forward propagation algorithm can be derived from the error function. However, with this method, a designer does not know what expected properties are with the new error functions. It is desirable instead to design desired error signals and then integrate the error signals to obtain error functions. In the present method and system the task of constructing an error function is translated into the task of designing an error signal. A set of error functions, named higher-order entropy error functions are derived. These functions deal with false saturation in MSE and over specialization in CE.

In the present embodiment, the neural network classifier 15 comprises a Muliti-Layer Perceptron ALP) 22 illustrated in FIG. 2. The MLP 22 is a widely employed neural network in pattern classification. The Multi-Layer Perceptron 22 follows the classic model of having an input layer 24, an output layer 28 and an intermediate hidden layer 26 which may comprise one or more layers. The input layer 24 receives inputs from the vector generator 12. These values are passed onto the connected units of the hidden layer 26, generally via weighted connections. The hidden layer nodes sum up inputs, perform a non-linear transformation of the summed input and pass the transformed values to subsequent layers. In this embodiment, the subsequent layers comprise the output layer 28. The hidden layer 26 resolves the vectors into a single dimension providing a value of a confidence level for a decoded word.

A more generalized level description of operation at a given node, j in an arbitrary l is illustrated in FIG. 3. FIG. 3 illustrates a single node 30 and one hidden layer 26 receiving a plurality of inputs y(t). Inputs come from a previous layer l−1 and a plurality of nodes 1 . . . $N_l$_1, where N is the number of nodes in layer l−1. The addition function is represented by the adder 32, and the function operator 34 represents the non-linear transformation of the summed input according to an arbitrary function φ.

The error signal is the difference between the signal being reported at the node 28 and the target output ($t_j$), where the target output $t_j$ is one for a correct output at a node j and zero for an incorrect output. For a node j at a layer l, its error signal may be expressed as $$\delta_j^l = \frac{\partial e^2(t)}{\partial y_j^l(t)} \cdot \frac{\partial y_j^l(t)}{\partial x_j^l(t)} = -\frac{\partial e^2}{\partial y_j^l(t)} \cdot \varphi'(x_j^l(t))$$

$y_j^l(t)$ is the output of the node non-linear function for φ(•) for node j at layer l, $x_j^l(t)$ is the net input of the node non-linear function φ(•) for node j at layer l. φ'(•) denotes its differential function. Node operation function φ(•) employed in the function operator 34 of FIG. 3 is often a sigmoid function. The sigmoid function takes the form of $$\phi(x) = \frac{1}{1+e^{-x}}.$$

The differential function φ'(•) is φ'(x)=φ(x)(1−φ(x)). The BP algorithm back-propagates the error signal from the output layer in the present embodiment at node 28 to hidden layers and then to input layer 24 for training purposes. The weights to node j at layer l can be updated as $w_{i,j}^l(t+1)=w_{i,j}(t)+\eta\cdot\delta_j^{l(t)\cdot y}{}_i^{l-1}(t)$. $y_i^{l-1}(t)$ is the input from node i layer l−1.

Since the BP algorithm back-propagates the error signal from the output layers and hidden layers to the input layer, it is desired to produce an error signal that is useful for this function. As alluded to above, the MSE function classifier does not produce a suitable error signal. It is a known characteristic of a means square error classifier to be subject to false saturation. In this condition, actual outputs of classifier 15 are completely wrong with respect to target outputs. For example, a target output might be 1.0 while the actual output is close to 0.0. A training period must be made long enough so that target error functions will not be based on false premises. This is further illustrated with respect to FIGS. 4 and 5 which are each a series of plots for target error signal versus actual error signal for target output of 1.0 and 0.0 respectively. FIGS. 4 and 5 include four plots of error signal delta versus actual output x in each figure, the solid line represents the ideal output, the short dashed line curve represents the error signal in accordance with the present invention. The mixed dotted curve represents error signal for cross entropy functions, and the long dashed line represents the error signal having false saturation.

False saturation is illustrated by reference to FIG. 4, at the point where the target output is 1.0, the error signal is very close to zero when the actual output is true, namely having a value 1.0 and while the actual output is false, namely having value of 0.0, the error signal is still zero. In FIG. 5, in which a target output of 0.0 is illustrated, false saturation occurs when the actual output is 1.0. When the false saturation occurs, the error signals for output nodes in the MSE embodiment are close to zero and the BP algorithm back-propagates zero exit error signals from output layer to hidden layer. A close to zero error signal applied in a weight updating equation causes little change to connection weights. Only after significantly more training samples are provided will the error signal take on a value different from that at the false saturation points.

The cross entropy function resolves the false saturation problem for mean square error classifiers and is widely used. As seen is FIGS. 4 and 5 that the cross entropy model is not subject to saturation. However, when the actual outputs approach the target outputs, it is seen that error signals keep substantially linear amplitude. Such error signals reflected back result in over specialization of the CE classifier, the linearity of the error signal narrows the range of generality the classifier 15 will have.

It has been noted that from the BP algorithm, the training process of the classifier 15 is controlled by the error signals. It is desirable to design error signals which may be integrated to produce error functions which avoid false saturation and over specialization. Therefore, an error function is designed that avoids false saturation end over specialization. Error signals are selected to be high values when actual outputs are false, and the error signals are stable as actual outputs approach true values. A desirable error signal should look like the solid or short dashed curves as shown in FIGS. 4 and 5. It is noted that the error signal for the cross entropy function is a line through point pairs $(t_j, 1-t_j)$ and $(1-t_j, t_j)$. Therefore, the curves as a direct function of this relationship, the error signal curves maybe given as $\delta_j^L=(2t_j-1)^{n-1}(t_j-y_j^L)$ n.

Further constraints on the desired error curves are nonlinear decay in order to avoid over specialization and passing through the true point pairs. This curve is the error signal of the cross entropy function when n=1. The curves 3 and 4 in FIGS. 4 and 5 respectively are cases of $\delta_j^L$ an n=2 and n=3 respectively. Compared with curves one and two, it is seen that the error signals $\delta_j^L$ remain high when as MSE classifier would be in false saturation and are two and three times smaller respectively than cross entropy functions with actual outputs approaching the target. Since the factors of $\delta_j^L$ are raised to higher powers that that of the error signal for the conventional cross entropy error signal, the designed error signal maybe referred to as a higher order entropy error function.

As stated above, the higher order entropy error function is expressed as an integral of the designed error signal. Therefore, the higher order entropy function is expressed as $$e(n) = -\int \sum_{j=1}^{L_n} \delta_j^L dx_j^L = -\sum_{j=1}^{L_n} \int_{o^+}^{1^+} \frac{(2t_j-1)^{n-1}(t_j-y_j^L)^n}{y_j^L(1-y_j^L)} dy_j^L.$$

The speech decoder 9 is now further described and defined further elements in the present embodiment, the speech decoder 9 is a Viterbi decoder, which is a finite state grammar based decoder. During decoding the phone-level acoustic signals further parameters are collected or calculated and the vector generator 12 provides inputs to the ANN classifier 15. In the present embodiment, eight dimensional vectors are produced having the dimensions A-stabil, LogAWEend, NscoreQ, N-active-leafs, NScore, Score-per-frame, Duration. In order to speed up LMP training, the feature vectors are normalized. The normalization formula for a feature x is $$x' = \begin{cases} \min & x \le \min \\ \frac{(x-\min)}{(\max-\min)} & < x < \max \\ \max & x \ge \max, \end{cases}$$

min and max are the minimum and maximum values of the feature x obtained in training data respectively.

Figure 6:
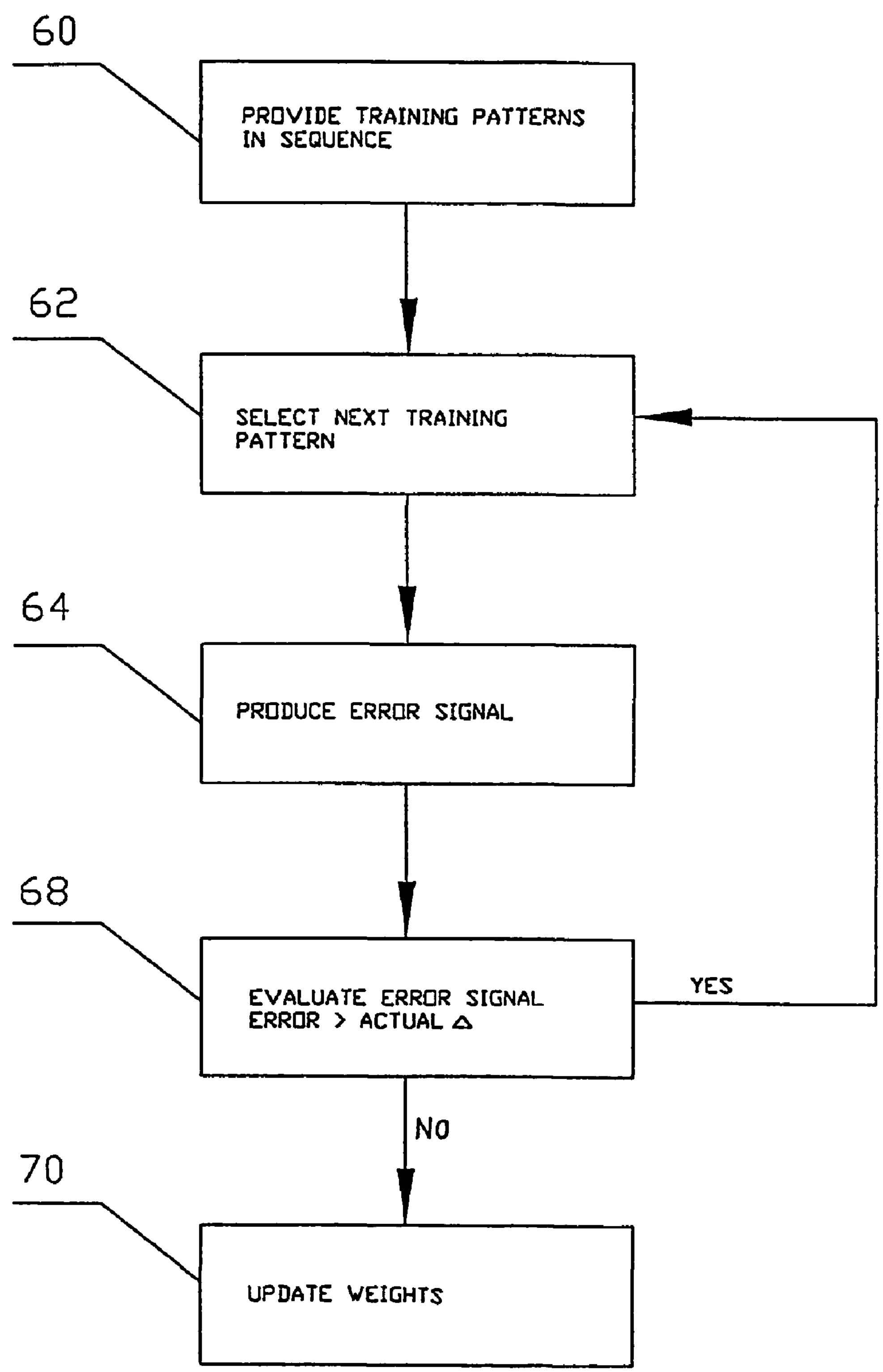
FIG. 6 is a flowchart illustrating training of the MLP classifier.

The BP algorithm for MLP training is implemented in a batch mode. The training continues until stopped in accordance with criterion. The stop criteria are based on the correct classification rate on a cross-validation test set. FIG. 6 is a flow chart illustrating the MLP training process. The learning rate for the ANN classifier 15 is updated according to the performance on a cross-validation set Implementation of this learning rate update is implemented by the following pseudocode.

```
New__Rate__Flag=True;
......
if((CurrentFrameRate-LastFrameRate)/LastFrameRate<Threshold))
{
  if(New__Rate__Flag==TRUE)
    Stop the MLP training;
else{
    LearningRate+LearingRate*Scale;
    New__Rate__Flag=TRUE;
  }
}
else
    New__Rate__Flag=FALSE;
```

In FIG. 6, provision of stored training patterns is represented at block 60. Patterns are provided in sequence, the sequence being determined by selecting each successive pattern as illustrated at block 62. The training data is forward propagated through the system, block 64 to produce an error signal at an output node such as node 28, as seen as block 68. At block 68, it is determined that the error signal is greater than the actual Δ between a target signal and an actual signal. If not, weights in the error function are updated at block 70, and if so processing continues with a next pattern at block 62. A next iteration provides a result indicative of a confidence level indicating the level of training. A threshold decision is made at block 70 as to whether to keep current the value of weights. When the training process is stabilized weight values are saved.

Tables 1-3 below represent MLP training are provided in tables 1, 2 and 3 for one set of data processed by an MLP trained by means where error function, cross entropy error function and higher order entropy function with a value of n=2.

The high order entropy error gives the best result with the system set at a false alarm rate of less than 5%, more than 52% of recognition errors were rejected.

TABLE 1

Classification Performance for the MLP trained by Mean Square Error Function

| Data Sets | Total Sample Number | Correct Accept | False Reject | Correct Reject | False Accept |
|---|---|---|---|---|---|
| Training | 11147 | 0.6735 | 0.0113 | 0.2313 | 0.0581 |
| Develop | 1898 | 0.7329 | 0.0094 | 0.2346 | 0.0750 |
| Test | 998 | 0.7163 | 0.0103 | 0.2585 | 0.0623 |

TABLE 2

Classification Performance for the MOP trained by Cross Entropy Error Function

| Data Sets | Total Sample Number | Correct Accept | False Reject | Correct Reject | False Accept |
|---|---|---|---|---|---|
| Training | 11147 | 0.7775 | 0.0353 | 0.4357 | 0.1409 |
| Develop | 1198 | 0.8519 | 0.0275 | 0.3923 | 0.1634 |
| Test | 998 | 0.8064 | 0.08398 | 0.4953 | 0.1557 |

TABLE 3

Classification Performance for the MLP trained by High Order Entropy Error Function (n = 2)

| Data Sets | Total Sample Number | Correct Accept | False Reject | Correct Reject | False Accept |
|---|---|---|---|---|---|
| Training | 11147 | 0.7911 | 0.0449 | 0.5114 | 0.1353 |
| Develop | 1898 | 0.8418 | 0.0355 | 0.5096 | 0.1346 |
| Test | 998 | 0.8153 | 0.0443 | 0.5295 | 0.1339 |

The above specification reaches that many specific variations may be made providing a system and designing an error signal in accordance with the present invention. Other well-know subunits may be used. Other forms of decoder than the Viterbi are wed-known. The above specification will enable those skilled in the art to make many departures from the specific examples above to produce a method and system in accordance with the present invention.

What is claimed is:

1. An artificial neural network classifier comprising:

an input layer of one or more nodes to receive training data;

an output layer L of one or more nodes to provide an actual output indicating a level of training of the artificial neural network classifier based on the training data; and at least a hidden layer of one or more nodes intermediate said input layer and said output layer, each node to receive input values via the input layer, each node to perform a transformation of the received input values based on a set of weights, each transformation to determine in part the actual output of output layer L, the set of weights to be updated based at least in part on an error function having an operator of the form $$\frac{(2t_j-1)^{n-1}(t_j-y_j^L)^n}{y_j^L(1-y_j^L)},$$

where $y_j^L$ is an actual output at node j of output layer L, $t_j$ is a target output at the node j, and n is greater than or equal to two, wherein the updated set of weights is to be used in determining confidence level information for a feature vector.

2. The artificial neural network classifier of claim 1 wherein $2 \leqq n \leqq 3$.

3. The artificial neural network classifier according to claim 2 wherein updating the set of weights based at least in part on an error function having an operator of the form $(t^j-y_j^L)^n$ comprises updating the set of weights based at least in part on an error signal derived from the error function, the error signal having an operator of the form $(2t_j-1)^{n-1}(t_j-y_j^L)^n$.

4. An automatic speech recognition system comprising:

a speech decoder to decode acoustic data;

a vector generator to calculate a feature vector based on the decoded acoustic data; and an adaptive neural network classifier to determine a confidence in the calculated feature vector, the determining based on a training of the adaptive neural classifier according to an error function having an operator of the form $$\frac{(2t_j-1)^{n-1}(t_j-y_j^L)^n}{y_j^L(1-y_j^L)},$$

where $y_j^L$ is an actual output at node j of an output layer L of the adaptive neural network classifier, $t_j$ is a target output at the node j, and n is greater than or equal to two.

5. The automatic speech recognition system according to claim 4 wherein said vector generator comprises a normalizing circuit for determining a normalization x' of a feature vector x according to $$x' = \begin{cases} \min & x \le \min \\ \frac{(x-\min)}{(\max-\min)} & < x < \max \\ \max & x \ge \max, \end{cases}$$

where "min" and "max" are the minimum and maximum value of feature x respectively in a set of training data.

6. The automatic speech recognition system according to claim 4 wherein said vector generator comprises calculation circuits to produce an 8-dimensional feature vector.

7. The automatic speech recognition system according to claim 6 wherein said 8 dimensions comprise A-stabil, LogAWE-end, NscoreQ, N-active-leafs, NScore, Score-per-frame, Duration.

8. The automatic speech recognition system according to claim 4 wherein said classifier comprises a multi-layer perceptron (MLP).

9. A method for training a neural network classifier to produce an output indicative of a confidence level for a decoded word, the method comprising:

providing a first training pattern to the neural network classifier having an output layer L of one or more nodes, the output layer L to provide an output indicating a level of training of the neural network classifier;

forward propagating the training pattern through the neural network classifier, the propagating based in part on a set of weights;

determining an error signal based on the propagated training pattern, the error based on an error function having an operator of the form $$\frac{(2t_j-1)^{n-1}(t_j-y_j^L)^n}{y_j^L(1-y_j^L)},$$

where $y_j^L$ is an actual output at node j of output layer L of the neural network classifier, $t_j$ is the value of a target output at the node j, and n is greater than or equal to two; and updating the set of weights based on the determined error signal, the updated set of weights to be used in producing the output indicative of the confidence level for the decoded word.

10. The method according to claim 9 wherein 2≦n≦3.

11. A computer-readable medium storing instructions thereon which when executed by one or more processors cause the one or more processors to perform the method of:

implementing a multiple layer perceptron having an output layer L of one or more nodes, the output layer L to provide an output indicating a level of training of the multiple layer perceptron, performing, via the implemented multiple layer perceptron, a series of linear transformations of a set of training data, the linear transformations based on a set of weights;

determining an error signal for an output of the linear transformations, the error signal based on an error function having an operator of the form $$\frac{(2t_j - 1)^{n-1}(t_j - y_j^L)^n}{y_j^L(1 - y_j^L)},$$

where $y_j^L$ is an actual output at node j of output layer L, $t_j$ is a target output at a node j, and n is greater than or equal to two;

updating the set of weights based at least in part on the error signal;

receiving a multiple-dimension feature vector based on decoded acoustic data; and determining, via the multiple layer perceptron, a confidence level of the feature vector, the determining based on the updated set of weights.

12. A computer-readable medium according to claim 11, the method further comprising:

normalizing each said multiple dimensions of said output vector in accordance with the maximum and minimum values for each dimension over a set of training data.

* * * * *

UNITED STATES PATENT AND TRADEMARK OFFICE
CERTIFICATE OF CORRECTION

PATENT NO. : 7,346,497 B2
APPLICATION NO. : 10/332651
DATED : March 18, 2008
INVENTOR(S) : Pi et al.

It is certified that error appears in the above-identified patent and that said Letters Patent is hereby corrected as shown below:

In column 7, at line 25, delete "reaches" and insert --teaches--.

In column 7, at line 29, delete "wed-known" and insert --well-known--.

In column 7, at line 67, delete " $(t\text{-}y_j^L)^n$ " and insert -- $(t_j - y_j^L)^n$ --.

In column 8, at line 30, delete "

$$x' = \begin{cases} \min & x \le \min \\ \frac{(x - \min)}{(\max - \min)} & < x < \max \\ \max & x \ge \max, \end{cases}$$

" and insert

--

$$x' = \begin{cases} \min & x \le \min \\ (x - \min) / (\max - \min) & \min < x < \max, \\ \max & x \ge \max \end{cases}$$

--.

Signed and Sealed this

Thirteenth Day of January, 2009

JON W. DUDAS
*Director of the United States Patent and Trademark Office*